United States Patent [19]

Gaston et al.

[11] 4,293,224

[45] Oct. 6, 1981

[54] OPTICAL SYSTEM AND TECHNIQUE FOR UNAMBIGUOUS FILM THICKNESS MONITORING

[75] Inventors: Charles A. Gaston, Poughkeepsie; Joseph P. Kirk, Chelsea; Chester A. Wasik, Poughkeepsie, all of N.Y.

[73] Assignee: International Business Machines Corporation, Armonk, N.Y.

[21] Appl. No.: 966,415

[22] Filed: Dec. 4, 1978

[51] Int. Cl.$^3$ .............................................. G01B 9/02
[52] U.S. Cl. ................................................... 356/357
[58] Field of Search ........................ 356/357; 350/166

[56] References Cited

U.S. PATENT DOCUMENTS 3,737,237 6/1973 Zurasky .............................. 356/357
4,047,805 9/1977 Sekimura ............................ 350/166

OTHER PUBLICATIONS

Franz; I., and W. Langheinrich, "A Simple Non-Destructive Method of Measuring the Thickness of Transparent Thin Films Between 10 and 600 nm," *Solid State Electronics*, Pergamon Press, 1968, vol. 11, pp. 59-64.
Edwards; R. B., "Three Color Laser Interferometer," IBM Technical Disclosure Bulletin, vol. 16, No. 2, Jul. 1973.

*Primary Examiner*—Conrad J. Clark

*Attorney, Agent, or Firm*—James M. Thomson; Theodore E. Galanthay; Joseph C. Redmond, Jr.

[57] ABSTRACT

An optical system and technique for monitoring a monotonic change in the thickness of a transparent film by means of optical interference, and for eliminating ambiguity in the identification of absolute film thickness. The system is particularly adapted for monitoring the etching of a dielectric film of uncertain initial thickness in microelectronic fabrication. The technique utilizes a white light source directed upon the film. Reflected light, modified by optical interference in the dielectric film, is monitored by photodetectors at two distinct wavelengths. The cyclic patterns of intensity change at the two wavelengths are compared to identify unambiguously the absolute thickness of the film, although the initial uncertainty in film thickness may have corresponded to several cycles of either wavelength pattern alone. To simplify phase comparison of the two cyclic patterns, wavelengths can be selected so that some particular coincidence of extrema in the two signals occurs at a film thickness less than the expected minimum initial thickness, and does not occur at any greater thickness up to and including the expected maximum. Determination of the absolute film thickness in this way permits further tracking of the etching process to the desired end point without overshoot.

10 Claims, 2 Drawing Figures

OPTICAL SYSTEM AND TECHNIQUE FOR UNAMBIGUOUS FILM THICKNESS MONITORING

DESCRIPTION OF THE INVENTION

Technical Field

The present invention relates to an optical analyzer adapted for monitoring a monotonic change in the thickness of a transparent film. More particularly, the invention relates to a system and technique for unambiguously monitoring the thickness of a transparent film during an etching process, for example.

It is an object of the invention to provide an optical system for monitoring monotonic changes in the thickness of a transparent film, and for determining the absolute value of film thickness during the monitoring process.

It is another object of the invention to provide a system for monitoring absolute film thickness during a subtractive process such as a quartz etching process, for example.

It is a further object of the invention to provide an optical technique utilizing light of two frequencies to identify the absolute value of thickness of a transparent film whereby the desired end point of an etching process can be accurately predicted or controlled.

It is another object of the invention to provide an optical system incorporating a minimum number of components, yet achieving high efficiency in monitoring optical interference at two distinct wavelengths, and in providing a polychromatic optical image of the region being monitored.

These and other objects and features are attained in a system which utilizes a white light source directed upon the film to be monitored. Reflected light, modified by optical interference in the dielectric film, is monitored by photodetectors at two distinct wavelengths. The cyclic patterns of intensity change at the two wavelengths are compared to identify unambiguously the absolute thickness of the film, although the initial uncertainty in film thickness may have corresponded to several cycles of either wavelength pattern alone. To simplify phase comparison of the two cyclic patterns, wavelengths can be selected so that some particular coincidence of extrema in the two signals occurs at a film thickness less than the expected minimum initial thickness, and does not occur at any greater thickness up to and including the expected maximum. Determination of the absolute film thickness in this way permits further tracking of the etching process to the desired end point without overshoot.

BACKGROUND ART

Numerous techniques are known in the art for measuring the thickness of a transparent film by optical means. All require measuring the intensity of a light beam which interacts with the film, as some parameter of the system is scanned (e.g., wavelength, angle of incidence, polarization, etc.). Where it is necessary to monitor a changing film thickness, these techniques become impractically slow or expensive. Fortunately, the very thing which works against those techniques provides an alternative solution. The change in film thickness can itself be the necessary scanning variable.

It is a well known optical phenomenon that light of a given wavelength shining through or reflected from a transparent film will interfere with itself constructively or destructively, depending upon the thickness of the film. Therefore if a film is steadily increasing or decreasing in thickness, such interference will impose a sinusoidal intensity fluctuation on the transmitted or reflected light.

Cyclic changes in optical interference are well known in the prior art for monitoring changing thickness of a transparent film. In particular, it is well known to determine or control the absolute thickness of a deposited film, as in a sputter deposition process, by counting the number of cycles in the optical interference signal, starting when the film being deposited has zero thickness. The same technique has been applied to monitoring decreasing film thicknesses, but in this case the initial film thickness may not be known accurately enough to determine absolute thickness unambiguously.

This general technique has been improved by utilizing light of two slightly different wavelengths instead of one to form interference patterns, with the outputs of two detectors being subsequently combined by sum and difference amplifiers, for example, to more accurately identify the desired film thickness. With all such systems, however, a restriction existed that film thickness could only be analyzed with respect to a known reference or starting point. Cyclic repetition in the output of such systems provides only ambiguous information on absolute thickness, in the absence of other information.

On the other hand, in the semiconductor industry where it is necessary to etch away certain films such as quartz films, for example, the films are often of indeterminate thickness at the start of a processing step. For example, a usual etching process utilizes a silicon wafer having a quartz film deposited thereon which is to be etched away to a certain level. The thickness of the quartz film falls within a predetermined thickness range but the absolute thickness of the film will vary from wafer to wafer depending upon the accuracy of process control at an earlier stage in manufacturing. Accordingly, a need exists to know the absolute value of the thickness of quartz films utilized in semiconductor processing at some point prior to the completion of etching processing. This in turn would enable the prediction of a desired end point of the process so that the process end point could be reached without etching overrun.

BRIEF DESCRIPTION OF THE DRAWINGS

Certain features and advantages of the invention will be explained hereinafter in the detailed description of the invention taken in conjunction with the drawings wherein.

DISCLOSURE OF THE INVENTION

In some systems intended to monitor a changing film thickness, it is necessary to know the absolute thickness, not just the change from some unknown initial value. Optical interference in a transparent film can modulate a monochromatic beam so that its amplitude has a sinusoidal component if the thickness changes steadily. A thickness change of $\lambda/2n$ (where $\lambda$=wavelength and n=refractive index) corresponds to a complete cycle of the sinusoidal signal. Accordingly a single monochromatic beam will resolve an initial thickness uncertainty no larger than $\lambda/2n$. For normal optical material ($n\approx1.5$) and convenient wavelength ($\lambda\leq 1$ $\mu$m) this means that the initial film thickness must be known within about 0.3 $\mu$m to avoid ambiguity of reflectivity orders.

On the other hand, if the sinusoidal signal from a second wavelength is available, it becomes possible to avoid ambiguity even with a far larger uncertainty in the initial thickness. For example, if the values of $\lambda/2n$ for the two wavelengths are 0.15 and 0.25 $\mu$m, the repeat cycle or unambiguous range for the joint signal is three times as long as for longer wavelength signal alone.

If the phase of a sinusoidal signal could be determined with mathematical accuracy, there would be no limit to the range that could be made unambiguous with two different wavelength signals. Thus, with two sinusoidal cycle lengths in the ratio of m:m+1, the combined repeat cycle is m times as long as for the longer cycle alone. However, a practical system must take into account the uncertainty in locating peaks. Assuming that the peak of a sinusoid can be determined within plus or minus a fraction F of a cycle, the following equations allow determination of the initial thickness uncertainty which can be resolved unambiguously.

Let $\lambda_1$ and $\lambda_2$ be the two wavelengths, and let $n_1$ and $n_2$ be the corresponding refractive indices in the film to be monitored.

Define $$R = \frac{\lambda_2 n_1}{n_2 \lambda_1} = \text{wavelength ratio within the film.}$$

Then the joint signal may seem to repeat after $m_1$ cycles of the signal from wavelength $\lambda_1$ and $m_2$ cycles of the signal from $\lambda_2$ (because the peaks can match again within the measurement accuracy) if $$m_1 - m_2 R \leq (R+1) F.$$

Figure 1:
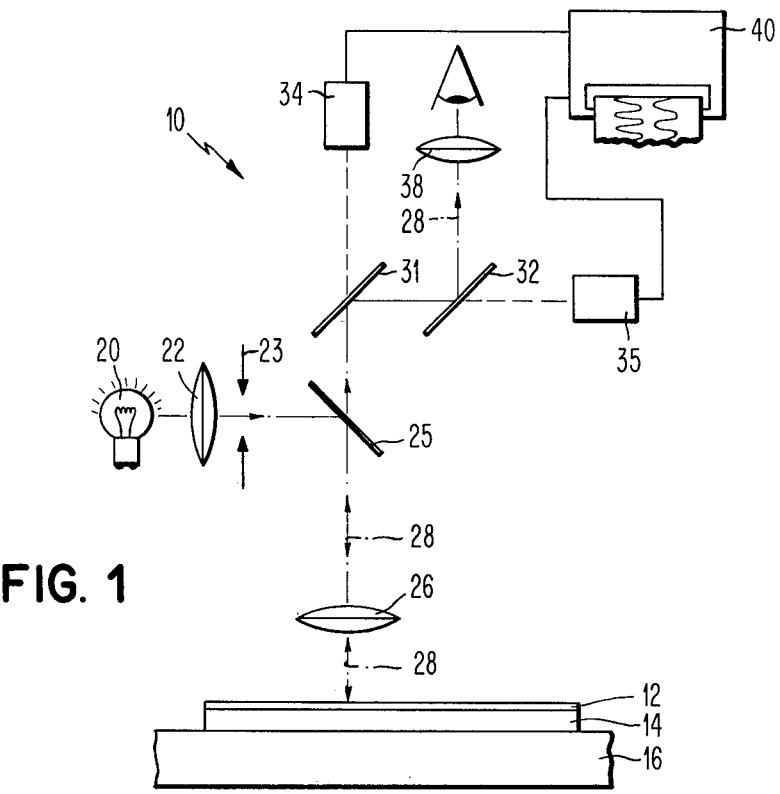
FIG. 1 is a schematic diagram of an optical system for projecting a white light beam upon a surface, for monitoring the intensity of light reflected from that surface at two distinct predetermined wavelengths, and for forming an image of that surface in all wavelengths other than the ones extracted from the beam for monitoring.

Referring now to the drawings and particularly to FIG. 1 an optical system 10 is described for analyzing the thickness of a transparent film 12 retained upon a wafer 14 that is supported in operative relationship to the instrument on a suitable support 16. For example, wafer 14 may comprise a silicon wafer having a quartz film deposited thereon and being arranged as one of a plurality of wafers in an etching system. It should be apparent that the optical system described is intended to be part of a control system for determining the desired end point of the etching step in a manner described hereinafter.

The optical system includes a white light source 20 and a lens and aperture system 22, 23 adapted to direct light toward a neutral beam splitter 25. Preferably beam splitter 25 comprises a glass plate having a metallized or dielectric film deposited upon one side so that the element is partially reflective to light of all wavelengths. A lens 26 receives light from the beam splitter and focuses it in a selected spot on the surface of film 12. Light is reflected from both the upper surface and the lower surface of film 12 and returns along a light path 28 through lens 26 and through beam splitter 25.

The reflected light is partially reflected by a narrow band pass filter 31 and a narrow band pass filter 32 adjusted as illustrated in the figure. For example filters 31 and 32 might comprise a glass plate coated upon one side with a built-up sequence of dielectric coatings adapted to pass light of a desired wavelength while reflecting light of all other wavelengths. Filter 31 passes light of a first predetermined wavelength and filter 32 passes light of a second predetermined wavelength. A photodetector 34 is adapted to receive light passing through filter 31 and a similar photodetector 35 is adapted to receive light passing through filter 32. The remaining light which is reflected by both band pass filters along beam path 28 is received at a lens 38 where it can be focused to permit visual observation of the location of the source spot upon film 12. This permits visual observation and alignment of the spot with a specific target on the wafer, if desired.

It should be apparent that the optical system described here contains a particularly effective means of extracting one or more monochromatic beams from a polychromatic beam, and that the principle could be used to advantage in implementing techniques described in the prior art. More particularly, the use of filters 31 and 32 set at an angle to the incident beam so that the reflected wavelengths are directed at other optical components, i.e. as a beam splitter, is believed to be a novel and unobvious application.

Figure 2:
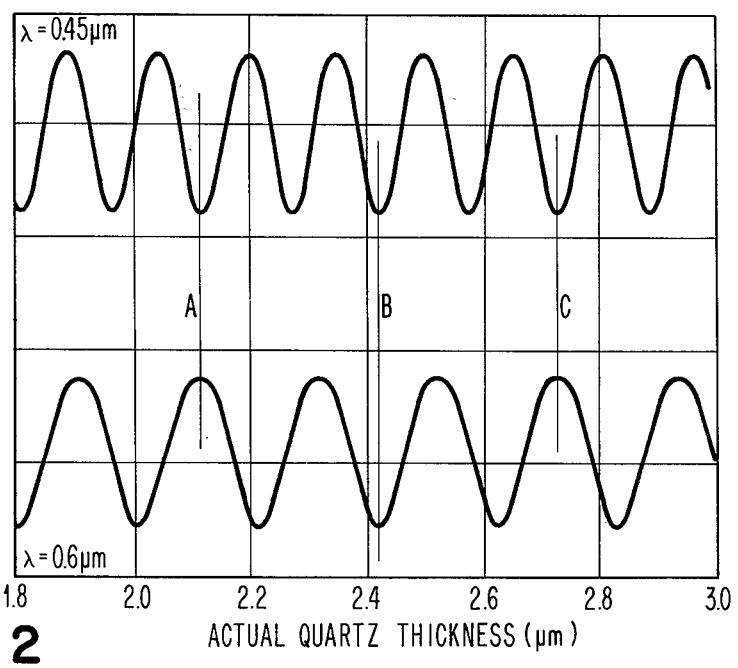
FIG. 2 is a graph illustrating the output of the optical instrument described in FIG. 1, when the target surface is a transparent film steadily decreasing in thickness, and the two wavelengths being monitored are selected to produce a ratio of about 1.33 between the two cycle lengths.

The system otherwise includes a strip chart recorder 40 adapted to receive dual inputs and provide a concurrent record of both signals such as that illustrated in FIG. 2. Thus, the strip chart recorder converts the electrical output of the photodetector 34 to a substantially sinusoidal plot of the changes in amplitude of the wavelength passed by filter 31 which occur in response to corresponding changes in the thickness of film 12. By the same token, the output of photodetector 35 is likewise presented as a substantially sinusoidal plot which illustrates the corresponding changes in amplitude that occur in the wavelength passed by filter 32.

It should be apparent that each wavelength selected produces a different interference pattern, based upon the wavelength and the refractive index of quartz for the particular wavelength selected. Thus, the first interference pattern shows maximum and minimum points which are out of phase with the maximum and minimum points for the second wavelength. However, at certain points coincident extrema do occur. For example, in FIG. 2 it can be seen that there are no coincident maxima within the thickness range shown, but there is a coincident minimum indicated by the line B at 2.42 $\mu$m thickness, and coincidences of minima with maxima at A and C (at 2.12 and 2.74 $\mu$m, respectively). Consequently, if the thickness of film 12 is known to be initially within the range of 2.2 to 2.7 $\mu$m, then the observation of the first coincidence between a minimum in the 0.45 $\mu$m signal and a maximum in the 0.6 $\mu$m signal permits an absolute determination that a film thickness of 2.12 $\mu$m has been achieved in the etching process.

Thereafter, the extrema occurring in either of the two signal records can be utilized to determine the amount of material removed in the etching process and to predict accurately the arrival of the desired end point thickness. This enables satisfactory control of the process to remove quartz film down to a predetermined level in the process without overshoot. This can be accomplished through operator control, or automatically, if desired.

It should be apparent that the wavelengths selected, 0.6 and 0.45 μm, are not the only wavelengths which could be utilized. In fact, because the refractive index of quartz is not identical at these two wavelengths, the nominal 1.33 ratio was not achieved exactly, and a maximum-minimum coincidence (rather than a maximum-maximum coincidence) provided the best phase reference. A small change in the wavelengths used can produce a large change in the locations of coincident extrema.

In selecting two wavelengths suitable for unambiguous film thickness monitoring, it is preferred to have one wavelength as short as possible to enhance accuracy in identifying the final thickness. It is also desirable to select a frequency ratio that will produce a uniquely recognizable coincident peak at an appropriate thickness, i.e., a ratio that will permit certain visual identification of the correct coincident extrema by an operator.

It is also necessary, of course, to select a ratio which has a large enough repeat cycle between coincident extrema that the expected range of film thickness to be monitored will not include any coincident point and thereby mask the actual film thickness. The first coincident point observed for any wafer in the expected range of film thickness should occur after thickness is reduced below the minimum expected initial value.

In view of these factors it has been determined that a wavelength ratio (R) of 1.33 is advantageous for a range of practical applications. This ratio produces coincident maxima separated by 3 cycles in the one signal and 4 cycles in the other. If the refractive index of the film is 1.5, and the shorter wavelength is 0.45 μm, this ratio permits resolution of an initial thickness uncertainty as large as 0.6 μm, while producing no "false coincidence" with less than 0.28 cycle separation between the two peaks.

TABLE I

| No. of Cycles Between Coincident Maxima | Optimum Wavelength Ratio (R) | Allowable Peak Location Error (F) |
| --- | --- | --- |
| 2 | 2/1 = 2.0 | .3333 |
| 3 | 3/2 = 1.5 | .2 |
| 4 | 4/3 = 1.3333 | .1429 |
| 5 | 5/3 = 1.6667 | .125 |
| 6 | 6/5 = 1.2 | .0909 |
| 7 | 7/4 = 1.75 | .0909 |
| 8 | 8/5 = 1.6 | .0769 |
| 9 | 9/5 = 1.8 | .0714 |
| 10 | 10/7 = 1.4286 | .5088 |
| 11 | 11/6 = 1.8333 | .0588 |

Table I sets forth other suitable wavelength ratios, each being related to an allowable fractional cycle peak location error within the system, and a corresponding number of cycles of the shorter wavelength signal that would occur from one coincident maximum point to the next. From this Table it should be generally apparent that larger uncertainties in film thicknesses, which require a larger number of cycles between coincident points, also require a more accurate peak location capability.

It should be apparent that there are many other optical configurations which could produce the two different sinusoidal signals necessary to eliminate thickness ambiguity. Conventional beam splitters and normal-incidence narrowband filters could be used in place of the oblique-incidence narrowband filters. The illuminating beam need not strike the film with normal incidence. Dual monochromatic beams could follow completely independent paths to and from the film. A single photodetector could sample the two wavelengths alternately. Wavelength ratios greater than 2 are possible if nonvisible wavelengths are used. A coincidence of extrema occurring within the initial thickness range can be bypassed (assuming that the spacing between the later coincidences is larger than the initial uncertainty) by delaying sufficiently the start of the search for coincidence. Wavelength ratios other than those listed in Table I may be used if care is taken to assure that the pattern of coincidental extrema permits unambiguous thickness identification with the available peak location accuracy. It is even possible to utilize more than two distinct wavelengths to extend the number of cycles between indistinguishable coincidences of extrema. These variations on the preferred embodiment are intended to show that the present invention is not restricted to the specific implementaton described.

It should be apparent that the invention could be utilized in additive processing, as well, where the starting point for film thickness is not known accurately. The invention provides means beyond the optical instrumentation of the prior art for monitoring and controlling film thickness in additive or subtractive processing where the precise thickness of a film is not known at the starting point of processing.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by Letters Patent is:

1. An optical instrument for monitoring the increasing or decreasing thickness of a transparent film having an initial thickness within a predetermined range, and especially for eliminating ambiguity in the knowledge of the absolute thickness of said transparent film, comprising
    means for illuminating said film with at least two substantially different wavelengths of light,
    phototdetecting means for receiving said light and providing at least two output signals responsive to the changing intensity of optical interference in said film as said film increases or decreases in thickness, and
    means for comparing the phase relationship of said output signals by recognition of coincident extrema of said output signals whereby an unambiguous indication of the absolute thickness of said film having an initial thickness within said predetermined range is provided.

2. The instrument of claim 1 wherein said photodetecting means are responsive to the changing intensity of optical interference at just two wavelengths, which differ by a ratio which lies between 1 and 2.

3. The instrument of claim 2 wherein said ratio is approximately equal to one of the optimum ratios selected from the group 2.0, 1.5, 1.33, 1.67, 1.2, 1.75, 1.6, 1.8, 1.43 and 1.83.

4. The instrument of claim 3 wherein said ratio is approximately 1.33.

5. The instrument of claim 1 wherein said wavelengths are selected so that a particular coincidence of extrema first occurs at the same absolute thickness value for any initial thickness within the expected range.

6. The instrument of claim 1 wherein said illuminating means includes a beam of white light interacting with said transparent film and producing a modified beam by the mechanism of optical interference, and said photodetecting means is responsive to said modified beam and comprises,
at least a first filter means for removing light of a first wavelength from said modified beam, having a first photodetecting means associated therewith, and
a second filter means for removing light of a second wavelength from said modified beam, having a second photodetecting means associated therewith.

7. The instrument of claim 6 wherein said illuminating means includes a neutral beam splitter adapted to direct said beam of white light normally onto said transparent film and to direct said modified beam, reflected from said transparent film, toward said photodetecting means.

8. The instrument of claim 6 wherein each of said filter means comprises a narrow band pass filter used as a beam splitter to reflect the remaining unfiltered light therefrom.

9. The instrument of claim 1 wherein said photodetecting means has associated therewith imaging means for observing the location on said film which is being monitored by said photodetecting means.

10. The instrument of claim 9 wherein said illuminating means includes optical components for concentrating the illumination into an area approximating the field of view of said imaging means, and said photodetecting means includes optical components restricting its field of view to a known portion of the field of view of said imaging means, so that a specific portion of a complex surface may be located and monitored without interference from other portions.

* * * * *

UNITED STATES PATENT AND TRADEMARK OFFICE
CERTIFICATE OF CORRECTION

PATENT NO. : 4,293,224
DATED : October 6, 1981
INVENTOR(S) : Charles A. Gaston et al.

It is certified that error appears in the above-identified patent and that said Letters Patent are hereby corrected as shown below:

Column 5, line 52, Table I, ".5088" should read --.0588--.

Signed and Sealed this

Twentieth Day of July 1982

[SEAL]

Attest:

Attesting Officer

GERALD J. MOSSINGHOFF

Commissioner of Patents and Trademarks